United States Patent
Mayo et al.

(10) Patent No.: US 6,328,792 B1
(45) Date of Patent: Dec. 11, 2001

(54) INK COMPOSITIONS

(75) Inventors: James D. Mayo; Marcel P. Breton, both of Mississauga (CA); Fereshteh Lesani, Santa Clara, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/510,552

(22) Filed: Feb. 22, 2000

(51) Int. Cl.$^7$ ..................................................... C09D 11/00
(52) U.S. Cl. ..................... 106/31.43; 106/31.75; 106/31.87
(58) Field of Search ............... 106/31.43, 31.75, 106/31.87

(56) References Cited

U.S. PATENT DOCUMENTS

| | | | |
|---|---|---|---|
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/25 |
| 5,124,718 | 6/1992 | Koike et al. | 346/1.1 |
| 5,128,726 | 7/1992 | Cassano et al. | 355/308 |
| 5,371,531 | 12/1994 | Rezanka et al. | 347/43 |
| 5,528,384 | 6/1996 | Metcalfe et al. | 358/447 |
| 5,556,727 | 9/1996 | Ciccarelli et al. | 430/45 |
| 5,667,568 | 9/1997 | Sacripante et al. | 106/20 R |
| 5,688,312 | 11/1997 | Sacripante et al. | 106/31.49 |
| 5,700,316 | 12/1997 | Pontes et al. | 106/31.58 |
| 5,747,554 | 5/1998 | Sacripante et al. | 523/161 |
| 5,844,020 | 12/1998 | Paine et al. | 523/161 |
| 5,932,630 | 8/1999 | Kovacs et al. | 523/161 |
| 6,001,899 | * 12/1999 | Gundlach et al. | 523/160 |
| 6,086,661 | * 7/2000 | Malhotra et al. | 106/31.43 |
| 6,174,355 | * 1/2001 | Mayo et al. | 106/31.43 |

OTHER PUBLICATIONS

"Electroluminescence of doped organic thin films", Tang et al., *J. Appl. Phys.*, 65 (9), May 1, 1989, p. 3610–3616.

* cited by examiner

*Primary Examiner*—C. Melissa Koslow
*Assistant Examiner*—Veronica F. Faison
(74) *Attorney, Agent, or Firm*—E. O. Palazzo

(57) ABSTRACT

An ink composition comprised of a colorant, potassium iodide, and a poly(quaternary amine), and which ink possesses a pH of from about 7.5 to about 12.

34 Claims, No Drawings

INK COMPOSITIONS

PENDING APPLICATIONS AND PATENTS

Illustrated in U.S. Ser. No. 09/511,126, filed concurrently herewith, the disclosure of which is totally incorporated herein by reference, is a process which comprises the development of an image on a substrate containing a hydrophilic layer; and in U.S. Ser. No. 09/511,127, filed concurrently herewith, the disclosure of which is totally incorporated herein by reference, is an ink composition comprised of (1) a vehicle, (2) a mixture of colorants, and (3) a polyquaternary ammonium salt. Disclosed in U.S. Pat. No. 6,132,499, the disclosure of which is totally incorporated herein by reference, is an ink composition comprised of (1) a carbamate or thiourea each with a melting point of from about 60° C. to about 120° C. and an acoustic-loss value of from about 25 to about 80 dB/mm, (2) an alcohol compound with melting point of about 25° C. to about 90° C. and with an acoustic-loss value of from about 5 to about 40 dB/mm, (3) a lightfastness component, (5) an antioxidant, and (6) a colorant; in U.S. Pat. No. 6,174,355, the disclosure of which is totally incorporated herein by reference, is an ink composition comprised of a colorant and poly(diallyl diethyl ammonium) bromide; and in U.S. Pat. No. 6,180,691, the disclosure of which is totally incorporated herein by reference, is a process for the preparation of an ink which comprises mixing an ink vehicle, a colorant and a latex containing a polymer with epoxy groups, and wherein said latex is generated by the polymerization of a mixture of olefinic monomers, and wherein at least one of said olefinic monomers is an unsaturated epoxide monomer and which polymerization is accomplished in the presence of an anionic surfactant, and a nonionic surfactant.

Also, illustrated in U.S. Pat. Nos. 5,688,312; 5,667,568; 5,700,316; 5,747,554; 5,844,020 and 5,932,630, the disclosures of which are totally incorporated herein by reference, are ink compositions, and particularly acoustic inks, and processes thereof.

The appropriate components and processes of the above pending applications may be selected for the present invention in embodiments thereof.

BACKGROUND OF THE INVENTION

The present invention is directed to ink compositions, and more specifically, the present invention relates to aqueous inks especially useful for thermal ink jet, and acoustic ink printing, reference for example U.S. Pat. No. 5,121,141, U.S. Pat. No. 5,111,220, U.S. Pat. No. 5,128,726, U.S. Pat. No. 5,371,531, and U.S. Pat. No. 5,528,384, the disclosures of which are totally incorporated herein by reference, including especially acoustic ink processes, such as an acoustic ink printer for printing images on a record medium. Also, the inks of the present invention may be useful as ink jet inks, and for thermal ink jet processes.

More specifically, the present invention is directed to substantially noncorrosive acoustic ink compositions, especially aqueous inks wherein there can be generated with such inks excellent developed images with acceptable image permanence, excellent projection efficiency on transparencies, superior waterfastness characteristics, for example waterfastness values of about 95 to about 100 percent, and excellent crease resistance, and wherein the inks need not contain certain salts, and moreover, wherein the inks reduce or minimize corrosion of, for example, ink jet heads by including in the inks an alkali metal halide, such as potassium iodide. Moreover, in embodiments of the present invention, there are provided inks that enable the elimination, or minimization of undesirable paper curl. The inks of the present invention in embodiments thereof are comprised of a colored vehicle and optionally a noncolored vehicle, reference U.S. Pat. Nos. 5,688,312; 5,667,568; 5,700,316; 5,747,554, the disclosures of which are totally incorporated herein by reference.

PRIOR ART

In acoustic ink printing, the printhead generates about 2.2 picoliter droplets by an acoustic energy process. The ink under these conditions should display a melt viscosity of about 25 centipoise or less at the jetting temperature. Furthermore, once the ink is jetted onto the paper, the ink image should be of excellent crease property, nonsmearing, waterfast, of excellent transparency and excellent fix qualities. In selecting an ink for such applications, it is desirable that the vehicle display a low melt viscosity, such as from about 1 centipoise to about 20, and preferably about 10 centipoise in the acoustic head, while also displaying solid-like properties after being jetted onto paper. Since the acoustic head can usually tolerate a temperature up to, for example, about 180° C. (Centigrade), and preferably up to a temperature of from about 100° C. to about 160° C., the vehicle for the ink should display liquid-like properties, such as a preferred viscosity of 1 to about 10 centipoise at a temperature of from about 25 to about 80° C.

Also known is an ink composition comprised of water, a colorant, and a monomeric oxazolidinone compound; an aqueous liquid vehicle, a pigment, and a vesicle-forming lipid, wherein vesicles of the lipid are present in the ink; an ink composition comprised of water, a colorant, a nonionic surfactant, and a fluorinated component; and a thermal ink jet printing which comprises incorporating into a thermal ink jet printer an ink composition comprising water; a colorant of a dye or pigment; a hydroxyamide derivative having at least one hydroxyl group and at least one amide group.

U.S. Pat. No. 4,840,674, the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 and U.S. Pat. No. 5,122,187, the disclosures of each of which are totally incorporated herein by reference, disclose hot melt ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, and the like.

U.S. Pat. No. 4,853,036 and U.S. Pat. No. 5,124,718, the disclosures of each of which are totally incorporated herein by reference, disclose, for example, an ink for ink jet recording which comprises a liquid composition comprising a colorant, a volatile solvent having a vapor pressure of 1 millimeter Hg or more at 25° C., and a solid material at room temperature.

Also known are thermal ink jet printing compositions comprising a dye, a liquid medium, and a surfactant selected from the group consisting of polyoxyalkylated ethers, anionic bitail fluorothio alkyls, alkyl aryl sulfonates, alkyl amine quaternary salts, and mixtures thereof.

While known compositions and processes are suitable for their intended purposes, a need remains for new acoustic aqueous ink compositions suitable for ink jet printing. In addition, there is a need for aqueous ink compositions which are compatible with a wide variety of plain papers. Further, there is a need for stabilized and substantially noncorrosive aqueous ink compositions, that is inks that do not substantially degrade the ink printheads, and aqueous ink compositions which generate high quality, waterfast images on plain papers. There is also a need for aqueous ink jet ink compositions, which generate high quality images on a wide variety of plain papers at low cost, with high quality text and high quality graphics. Further, there is a need for aqueous ink jet ink compositions which exhibit minimal feathering. Additionally, there is a need for aqueous ink compositions that exhibit excellent lightfastness properties on plain paper. Further, there is a need for aqueous ink jet ink compositions which are especially suitable for use in acoustic ink jet printing processes. Additionally, there is a need for aqueous ink compositions suitable for ink jet printing processes wherein the substrate is heated prior to printing, heated during the printing process, and is cooled to ambient temperature, about 25° C. for example, subsequent to printing (also known as heat and delay printing processes). There is also a need for ink compositions suitable for ink jet printing wherein high optical densities can be achieved with relatively low dye concentrations.

SUMMARY OF THE INVENTION

Examples of features of the present invention include, for example:

It is an feature of the present invention to provide ink compositions with many of the advantages illustrated herein.

It is another feature of the present invention to provide aqueous ink compositions suitable for aqueous acoustic ink jet printing.

It is yet another feature of the present invention to provide aqueous ink compositions which are compatible with a wide variety of plain papers.

It is still another feature of the present invention to provide substantially noncorrosive ink compositions which generate high quality images on plain papers.

Yet another feature of the present invention is to provide aqueous ink jet ink compositions which exhibit low viscosity of from about 1 to about 20, and preferably from about 1.5 to about 5 centipoise at a temperature of from about 25° C. to about 80° C.

Still another feature of the present invention is to provide aqueous ink jet ink compositions which exhibit minimal intercolor bleed.

It is another feature of the present invention to provide aqueous ink jet ink compositions which exhibit excellent image permanence such as lightfastness and waterfastness.

It is yet another feature of the present invention to provide aqueous ink jet ink compositions that are suitable for use in acoustic ink jet printing processes.

It is still another feature of the present invention to provide aqueous ink compositions that are suitable for ink jet printing processes wherein the substrate is heated prior to printing, heated during the printing process and is cooled to ambient temperature subsequent to printing (also known as heat and delay printing processes).

Another feature of the present invention is to provide ink compositions suitable for ink jet printing wherein high optical densities can be achieved with relatively low dye concentrations.

Another feature of the present invention resides in the provision of aqueous inks wherein the viscosity of the ink is from about 1 centipoise to about 5 centipoise (cP) at, for example, the jetting temperature which can be from about 25° C. to about 80° C., and preferably from about 30° C. to about 50° C. thereby enabling excellent jetting at reasonable power levels.

Aspects of the present invention relate to an ink composition comprised of a colorant, an alkali halide, preferably potassium iodide, and a poly(quaternary amine), and which ink preferably possesses a pH of from about 7.5 to about 12; an ink wherein the amine is poly(diallyl dimethyl ammonium)chloride, poly(diallyl diethyl ammonium) chloride, poly(diallyl dimethyl ammonium)bromide or poly(diallyl diethyl ammonium) bromide; an ink wherein the ink is aqueous and contains water; an ink wherein the water is present in an amount of about 50 to about 85 weight percent; an ink wherein the water is present in an amount of about 60 to about 85 weight percent; an ink wherein the weight average molecular weight of the amine is from about 1,000 to about 20,000; an ink wherein the amine is present in an amount of from about 0.5 to about 10 weight percent, and wherein the total of all ink components is about 100 weight percent; an ink wherein the amine is present in an amount of from about 1 to about 6 weight percent, and wherein the total of all ink components is about 100 weight percent; an ink wherein the colorant is a pigment; an ink wherein the colorant is a dye; an ink wherein the colorant is magenta, yellow, cyan, red, blue, green, black, or mixtures thereof; an ink wherein the colorant is a pigment or dye present in an amount of from about 0.01 to about 10 percent by weight; an ink wherein the colorant is a dye present in an amount of from about 1 to about 10 weight percent; an ink which possesses a pH of from about 8 to about 10, and which pH is achievable by the addition of a buffer component; an ink wherein the iodide is present in an amount of from about 1 to about 10 percent by weight; an ink further containing sulfolane; an ink further containing a buffering component; an ink containing a biocide; a process for reducing the corrosive characteristics of inks which comprise the admixing of a colorant, a quaternary amine and an alkali metal halide, and wherein the ink possesses a pH of from about 8 to about 10; a process wherein the halide is potassium iodide, and wherein the ink is substantially noncorrosive to ink jet heads; a printing process which comprises (a) incorporating into an acoustic ink jet printer the ink composition illustrated herein, and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of the ink with focused acoustic radiation to eject individual droplets of ink therefrom on demand, the radiation being directed to focus with a finite waist diameter in a focal plane, the ink comprising the components; and (b) causing droplets of the ink to be ejected onto a recording sheet in an imagewise pattern at an optional temperature of from about 25° C. to about 60° C.; a thermal ink jet process wherein images are developed with the ink illustrated herein; an ink composition wherein the colorant is an acid dye; an alkaline ink composition comprised of a colorant, potassium iodide, and a poly(quaternary amine), and which ink possesses a pH of from about 8 to about 12; an ink wherein the amine is poly(diallyl dimethyl ammonium) chloride; an ink wherein the amine is poly(diallyl dimethyl ammonium)bromide; an ink wherein the amine is poly(diallyl diethyl ammonium)bromide; an ink wherein the weight average molecular weight of the amine is from about 1,000 to about 10,000; an ink containing an alkaline buffer, which buffer maintains the pH of the ink between about 8 and about 11; an ink wherein the buffer is comprised of a mixture of tris(hydroxymethyl)aminomethane and tris (hydroxymethyl)aminomethane hydrochloride; an ink wherein the alkali metal halide is potassium bromide; an ink composition comprised water, a colorant, a quaternary amine polymer, such as a polyquaternary amine halide, like poly(diallyl dimethyl ammonium) chloride, available commercially as Calgon CP2253, Calgon Corporation, Ellwood City, Pa. poly(diallyl diethyl ammonium)chloride, poly (diallyl dimethyl ammonium) bromide poly(diallyl diethyl ammonium) bromide each of a weight average molecular weight of, for example, from about 1,000 to about 20,000, and an alkali metal halide, such as potassium iodide, and wherein the ink pH is, for example, about 7.5 or greater, for example about 8 to about 12, and preferably from about 8 to about 10, and which pH can be achieved by the addition of known buffers, such as the trizma buffers available from Sigma, like for example, a mixture of tris(hydroxymethyl) aminomethane and tris(hydroxymethyl)aminomethane hydrochloride and which inks possess, for example, excellent waterfastness, and less corrosive characteristics with respect, for example, to ink systems, especially the ink printheads.

Of importance with respect to the present invention is the incorporation into the ink of a quaternary amine, and an alkali metal halide, preferably potassium iodide, and wherein the pH of the ink is adjusted to be from about 8 to about 12 and preferably from about 8 to about 10 to eliminate or minimize ink jet component corrosion.

The ink vehicle is preferably water, preferably present in an amount of from about 50 to about 85 weight percent, and more preferably present in an amount of from about 60 to about 85 weight percent. Various types of water, such as distilled water, tap water, deionized water, and the like can be selected for the inks. Optionally the inks may contain solvents such as glycols, sulfones including sulfolane, alcohols including isopropanol, diethylene glycol monobutyl ether (butyl carbitol), 2-pyrrolidinone, n-alkyl pyrrolidinone where the alkyl group is a methyl or ethyl group thiodiethanol, and mixtures thereof, in amounts of about −5 to about −40 percent by weight. Moreover, the inks may contain a biocide, such as DOWICIL™ 150, 200 and 75, benzoate salts, sorbate salts, and the like in amounts of from about 0.0001 to about 4 percent by weight and preferably from about 0.01 to about 1 percent by weight.

The concentration or amount of the alkali metal halide, such as potassium chloride, potassium iodide, potassium bromide and the like in the ink can range from, for example, about 0.1 to about 10 percent by weight and preferably from about 2 to about 5 percent by weight.

Examples of colorants include dyes and pigments with a black color, a cyan color, a magenta color, a yellow color, a red color, a brown color, and the like, and color gamuts. The dye may be black, cyan, magenta, yellow, red, blue, green, brown, mixtures thereof, and the like, present in the ink in an effective amount of, for example, from about 1 to about 65, and preferably from about 2 to about 20 percent by weight of the ink, and most preferably in an amount of from about 1 to about 10 weight percent. Preferred dyes are yellow, cyan and magenta and black dyes available from different commercial sources such as Projet Yellow OAM or Acid Yellow 23, available from Zeneca and other conventional ink jet dyes such as Direct Blue 199, Acid Blue 9, Direct Blue 86, Acid Red 52, Acid Red 249, Projet Magenta 3 BOA available form Zeneca, Reactive Red 180, Direct Black 168, Food Black 2, Direct Yellow 132, Black X-34 available from BASF. More preferred dyes from the list above are acid dyes used in from about 2 to about 6 percent by weight in the inks of the present invention.

While dyes are preferred, suitable amounts of pigment colorants can be used. Examples of suitable black colorants include various carbon blacks, such as REGAL 330®, channel black, furnace black, lamp black, and the like, such as Levanyl Black A-SF (Miles, Bayer) and Sunsperse Carbon Black LHD 9303 (Sun Chemicals). Colored pigments include red, green, blue, brown, magenta, cyan, and yellow particles, and mixtures thereof. Illustrative examples of magenta pigments include 2,9-dimethyl substituted quinacridone and anthraquinone, identified in the Color Index as Cl 60710, Cl Dispersed Red 15, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthrathrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Sunsperse Quindo Magenta QHD 6040 (Sun Chemicals), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other dyes may also be selected.

Specific pigments, that can also be selected for the inks of the present invention are carbon blacks, like REGAL 330® available from Cabot Corporation, cyan, magenta, yellow, red, blue, green and the like pigments, which pigments are known, reference for example U.S. Pat. No. 5,556,727, the disclosure of which is totally incorporated herein by reference. The pigment amount selected is similar to the dye amount indicated herein.

The ink may also contain other known ink additives present in effective amounts, such as from about 0.01 to about 5 weight percent, like fillers, biocides and the like. Optional additives for further improving the jetting characteristics and the storage stability of the inks, and for preventing undesirable interactions of the inks with the printhead either during the jetting process or while the printer is idle, include humectants, such as ethylene glycol, diethylene glycol, N-methylpyrrolidinone, 2-pyrrolidinone, propylene glycol, hydroxyethers, ethers, amides, sulfoxides, ketones, lactones, esters, alcohols, and the like, present in an amount of from 0 to about 50 percent by weight, and preferably from about 5 to about 40 percent by weight; biocides like DOWICIL™ 75, 150, and 200, benzoate salts, sorbate salts, and the like, present in an effective amount of, for example, from about 0.0001 to about 4 percent by weight, and preferably from about 0.01 to about 2.0 percent by weight.

The inks of the present invention are particularly suitable for use in acoustic ink jet printing processes. In acoustic ink jet printing, reference the patents recited here, the disclosures of which have been totally incorporated herein by reference, an acoustic beam exerts a radiation pressure against features upon which it impinges. Thus, when an acoustic beam impinges on a free surface of the ink of a pool of liquid from beneath, the radiation pressure, which it exerts against the surface of the pool, may reach a sufficiently high level to release individual droplets of liquid from the pool, despite the restraining force of surface tension. Focusing the beam on or near the surface of the pool intensifies the radiation pressure it exerts for a given amount of input power. K.A. Krause, "Focusing Ink Jet Head," IBM Technical Disclosure Bulletin, Vol. 16, No. 4, September 1973, pages 1168 to 1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension, which thereafter causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Also, the size of the ejected droplets is determined by the waist diameter of the focused acoustic beam. Acoustic ink printing is attractive since it does not require the nozzles or the small ejection orifices which have caused many of the reliability and pixel placement accuracy problems that conventional drop on demand and continuous stream ink jet printers have suffered. The size of the ejection orifice is an important design parameter of an ink jet since it determines the size of the droplets of ink that the jet ejects. As a result, the size of the ejection orifice cannot be increased without sacrificing resolution. Acoustic printing has increased intrinsic reliability because there are no nozzles to clog. Furthermore, small ejection orifices are avoided so acoustic printing can be performed with a greater variety of inks than conventional ink jet printing, including inks having lower viscosities and inks containing pigments and other particulate components. Acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images.

Furthermore, the known droplet ejector technology can be adapted to a variety of printhead configurations including (1) single ejector embodiments for raster scan printing, (2) matrix configured ejector arrays for matrix printing, and (3) several different types of pagewidth ejector arrays ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Additional information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

The present invention also relates to a printing process which comprises (a) incorporating into an acoustic ink jet printer the ink composition as illustrated herein and containing the alkali metal halide and the quaternary amine, such as poly(diallyl dimethyl ammonium chloride) and poly(diallyl diethyl ammonium) bromide, and causing droplets of the ink to be ejected in imagewise pattern onto a substrate; a process which comprises (a) providing an acoustic ink printer having a pool of liquid ink with a free surface, and a printhead including at least one droplet ejector for radiating the free surface of the ink with focused acoustic radiation to eject individual droplets of ink therefrom on demand, the radiation being directed to focus with a finite waist diameter in a focal plane, the ink comprising the components indicated herein; and (b) causing droplets of the ink to be ejected onto a recording sheet in an imagewise pattern at a temperature of from about 25° C. to about 60° C.; an ink composition wherein the viscosity thereof is from about 1 centipoise to about 5 centipoise at a temperature of from about 25° C. to about 40° C.; an ink composition wherein the ink possesses a viscosity of from about 1 centipoise to about 20 centipoise at a temperature of from about 25° C. to about 40° C., and wherein the colorant is a dye, or a pigment present in an amount of from about 1 to about 10 weight percent and an ink where the pH thereof is preferably from about 8.0 to about 10.0.

Corrosion was tested with bare Alloy 42, a metal composed of 58 percent by weight of iron and 42 percent by weight of Ni. This metal, when exposed at elevated temperatures, from about 60 to about 90° C., to a quaternary amine based solution of Calgon CP 2253 corrodes in a short period of time, less than 2 hours. A 0.5 inch by 2 inches long strip of Alloy 42 was placed in a glass vial and submerged in ink. The vial was sealed and placed in an oven at a temperature of 75° C. Visual inspection of the vials at regular intervals was used to determine the level of corrosion.

The following Examples are provided:

EXAMPLE I

An ink composition was prepared as follows. A solution was prepared by combining at room temperature, about 22° C. throughout, and in the following order, 15 grams of sulfolane, 19.75 grams of deionized water, 10 grams of a 40 weight percent solution of poly(diallyldimethyl ammonium chloride), available from Calgon Corporation under the commercial name Calgon CP-2253, 2.5 grams of lithium chloride, 2.5 grams of a trizma buffer 33.64 percent of trizma hydrochloride tris(hydroxy methyl aminomethane hydrochloride) and 66.36 of tris(hydroxymethyl aminomethane), pH about 7.2, available from Sigma, 0.25 gram of butyl carbitol and finally 50 grams of a 8.5 weight percent solution Acid Yellow 23, available from Zeneca Corporation under the tradename Projet Yellow OAM. The resulting solution was then stirred at room temperature for an additional one hour and then filtered through a 1 micron glass fiber filter available from Gelman Sciences. The corrosive nature of the resulting ink was tested with Alloy 42 as indicated herein. A strip of Alloy 42 was about 75 percent corroded in about two hours when heated at 75° C. in the presence of the above prepared ink which was buffered at a pH of about 7.0.

EXAMPLE II

An ink composition was prepared as follows. A solution was prepared by combining at room temperature, about 22° C. throughout, and in the following order, 15 grams of sulfolane, 19.75 grams of deionized water, 10 grams of a 40 weight percent solution of poly(diallyldimethyl ammonium chloride), available from Calgon Corporation under the commercial name Calgon CP-2253, 2.5 grams of lithium chloride, 2.5 grams of trizma buffer pH 8.5 available from Sigma, 0.25 gram of butyl carbitol and finally 50 grams of a 8.5 weight percent solution Acid Yellow 23, available from Zeneca Corporation under the tradename Projet Yellow OAM. The solution resulting was then stirred at room temperature for an additional one hour and then filtered through a 1 micron glass fiber filter available from Gelman Sciences. The corrosive nature of the resulting ink was tested with Alloy 42 illustrated herein. A strip of Alloy 42 was about 70 percent corroded in about one week when heated at 75° C. in presence of the above ink which was buffered at a pH of about 8.5.

EXAMPLE III

An ink composition was prepared as follows. A solution was prepared by combining at room temperature, about 22° C. throughout, and in the following order, 15 grams of sulfolane, 19.75 grams of deionized water, 10 grams of a 40 weight percent solution of poly(diallyldimethyl ammonium chloride), available from Calgon Corporation under the commercial name Calgon CP-2253, 2.5 grams of potassium iodide, 2.5 grams of trizma buffer pH 7.0 available from Sigma, 0.25 gram of butyl carbitol and finally 50 grams of a 8.5 weight percent solution Acid Yellow 23, available from Zeneca Corporation under the tradename Projet Yellow OAM. The solution was then stirred at room temperature for an additional one hour and then filtered through a 1 micron glass fiber filter available from Gelman Sciences. The corrosive nature of the resulting ink was tested with Alloy 42 as illustrated herein. A strip of Alloy 42 was about 70 percent corroded in about two weeks when heated at 75° C. in presence of the ink which was buffered at a pH of about 7.

EXAMPLE IV

An ink composition was prepared as follows. A solution was prepared by combining at room temperature, about 22° C. throughout, and in the following order, 15 grams of sulfolane, 19.75 grams of deionized water, 10 grams of a 40 weight percent solution of poly(diallyldimethyl ammonium chloride), available from Calgon Corporation under the commercial name Calgon CP-2253, 2.5 grams of potassium iodide, 2.5 grams of trizma buffer pH 8.5 available from Sigma, 0.25 gram of butyl carbitol and finally 50 grams of a 8.5 weight percent solution Acid Yellow 23, available from Zeneca Corporation under the tradename Projet Yellow OAM. The solution was then stirred at room temperature for an additional one hour and then filtered through a 1 micron glass fiber filter available from Gelman Sciences. The corrosive nature of the resulting ink was tested with Alloy 42 as illustrated herein. A strip of Alloy 42 did not show any signs of corrosion for about eight weeks when heated at 75° C. in the presence of the above ink which was buffered at a pH of about 8.5.

EXAMPLE V

An ink composition was prepared as follows. A solution was prepared by combining at room temperature, about 22° C. throughout, and in the following order, 15 grams of sulfolane, 45.75 grams of deionized water, 10 grams of a 40 weight percent solution of poly(diallyldimethyl ammonium chloride), available from Calgon Corporation under the commercial name Calgon CP-2253, 2.5 grams of potassium iodide, 2.5 grams of trizma buffer pH 8.5 available from Sigma, 0.25 gram of butyl carbitol and 24 grams of a 10.0 weight percent solution Acid Blue 9, available from Tricon Colors. The resulting solution was then stirred at room temperature for an additional one hour and then filtered through a 1 micron glass fiber filter available from Gelman Sciences. The corrosive nature of the resulting ink was tested with Alloy 42 as described herein. A strip of Alloy 42 did not show any signs of corrosion in about eight weeks when heated at 75° C. in the presence of the above ink which was buffered at a pH of about 8.5.

EXAMPLE VI

An ink composition was prepared as follows. A solution was prepared by combining at room temperature, about 22° C., and in the following order, 15 grams of sulfolane, 43.75 grams of deionized water, 10 grams of a 40 weight percent solution of poly(diallyldimethyl ammonium chloride), available from Calgon Corporation under the commercial name Calgon CP-2253, 2.5 grams of potassium iodide, 2.5 grams of trizma buffer pH 8.5 available from Sigma, 0.25 gram of butyl carbitol, and finally 13 grams of a 10.0 weight percent solution Acid Red 52 available from Tricon Colors and 13 grams of a 10.0 weight percent solution of Projet Magenta 1T available from Zeneca Corporation. The solution was then stirred at room temperature for an additional one hour and then filtered through a 1 micron glass fiber filter available from Gelman Sciences. The corrosive nature of the resulting ink was tested with Alloy 42 as illustrated herein. A strip of Alloy 42 did not show any signs of corrosion for about ten weeks when heated at 75° C. in presence of the above prepared ink which was buffered at a pH of about 8.5.

Other modifications of the present invention may occur to those skilled in the art subsequent to a review of the present application, and these modifications, including equivalents thereof, are intended to be included within the scope of the present invention.

What is claimed is:

1. An ink composition comprised of a colorant, alkali metal halide, wherein the halide is potassium iodide, and a poly(quaternary amine), and which ink possesses a pH of from about 7.5 to about 12.

2. An ink in accordance with claim 1 wherein the amine is poly(diallyl dimethyl ammonium)chloride, poly(diallyl diethyl ammonium) chloride, poly(diallyl dimethyl ammonium)bromide or poly(diallyl diethyl ammonium) bromide.

3. An ink in accordance with claim 2 wherein the ink contains water.

4. An ink in accordance with claim 3 wherein said water is present in an amount of about 50 to about 85 weight percent, and the metal halide is potassium iodide.

5. An ink in accordance with claim 3 wherein said water is present in an amount of about 60 to about 85 weight percent.

6. An ink in accordance with claim 1 wherein the weight average molecular weight of said amine is from about 1,000 to about 20,000.

7. An ink in accordance with claim 1 wherein said amine is present in an amount of from about 0.5 to about 10 weight percent, and wherein the total of all ink components is about 100 weight percent, and the metal halide is potassium iodide.

8. An ink in accordance with claim 1 wherein said amine is present in an amount of from about 1 to about 6 weight percent, and wherein the total of all ink components is about 100 weight percent.

9. An ink in accordance with claim 1 wherein the colorant is a pigment.

10. An ink in accordance with claim 1 wherein the colorant is a dye.

11. An ink in accordance with claim 1 wherein the colorant is magenta, yellow, cyan, red, blue, green, black, or mixtures thereof, and the metal halide is potassium iodide.

12. An ink in accordance with claim 1 wherein the colorant is a pigment or dye present in said ink in an amount of from about 0.01 to about 10 percent by weight.

13. An ink in accordance with claim 1 wherein said colorant is a dye present in an amount of from about 1 to about 10 weight percent; and wherein said colorant is cyan, magenta, yellow, blue, green, brown, black, or mixtures thereof.

14. An ink in accordance with claim 1 and containing a vehicle.

15. An ink in accordance with claim 1 wherein said ink possesses a pH of from about 8 to about 10, and which pH is achievable by the addition of a buffer component, and the metal halide is potassium iodide.

16. An ink in accordance with claim 15 wherein the potassium iodide is present in an amount of from about 1 to about 10 percent by weight.

17. An ink in accordance with claim 1 further containing sulfolane.

18. An ink in accordance with claim 1 further containing a buffering component.

19. An ink in accordance with claim 1 containing a biocide.

20. A process for reducing the corrosive characteristics of inks which comprise the admixing of a colorant, a quaternary amine and an alkali metal halide, and wherein the ink possesses a pH of from about 7.1 to about 10.

21. A process in accordance with claim 20 wherein the metal halide is potassium iodide, and wherein said ink is substantially noncorrosive to ink jet heads.

22. A printing process which comprises (a) incorporating into an acoustic ink jet printer the ink composition of claim 1, and causing droplets of the ink to be ejected in imagewise pattern onto a substrate.

23. A process which comprises (a) providing an acoustic ink printer having a pool of liquid ink with a free surface, and a printhead including at least one droplet ejector for radiating the free surface of said ink with focused acoustic radiation to eject individual droplets of ink therefrom on demand, said radiation being directed to focus with a finite waist diameter in a focal plane, said ink comprising the components of claim 1; and (b) causing droplets of said ink to be ejected onto a recording sheet in an imagewise pattern at an optional temperature of from about 25° C. to about 60° C.

24. A thermal ink jet process wherein images are developed with the ink of claim 1.

25. An ink composition in accordance with claim 1 wherein said colorant is an acid dye.

26. An alkaline ink composition comprised of a colorant, potassium iodide, and a poly(quaternary amine); and which ink possesses a pH of from about 7.1 to about 12.

27. An ink in accordance with claim 1 wherein the amine is poly(diallyl dimethyl ammonium)chloride.

28. An ink in accordance with claim 1 wherein the amine is poly(diallyl dimethyl ammonium)bromide.

29. An ink in accordance with claim 1 wherein the amine is poly(diallyl diethyl ammonium)bromide.

30. An ink in accordance with claim 1 wherein the weight average molecular weight of said amine is from about 1,000 to about 10,000.

31. An ink in accordance to claim 1 containing an alkaline buffer, which buffer maintains the pH of the ink between about 8 and about 11.

32. An ink in accordance to claim 31 wherein the buffer is comprised of a mixture of tris(hydroxymethyl) aminomethane and tris(hydroxymethyl)aminomethane hydrochloride.

33. An ink in accordance with claim 1 wherein said alkali metal halide is potassium bromide.

34. An ink in accordance with claim 1 wherein said alkali metal halide is potassium iodide.

* * * * *